United States Patent Office 3,506,583
Patented Apr. 14, 1970

3,506,583
MONOMERIC, SOLID STATE SOLUTIONS OF CERTAIN AROMATIC DIAMINES IN DERIVATIVES OF BENZOPHENONETETRACARBOXYLIC ACID
William R. Boram and Luis Acle, Jr., San Diego, Calif., assignors to International Harvester Company, San Diego, Calif., a corporation of Delaware
No Drawing. Filed Mar. 14, 1968, Ser. No. 712,908
Int. Cl. C08g 20/32, 20/02; C09k 3/00
U.S. Cl. 252—188.3
4 Claims

ABSTRACT OF THE DISCLOSURE

Monomeric, resinoid, solid state solutions of certain aromatic diamines in derivatives of benzophenonetetracarboxylic acid. Processes for preparing such solutions and for converting them to polyimides and to polyamic acid precursors.

BACKGROUND AND SUMMARY OF THE INVENTION AND DESCRIPTION OF PREFERRED EMBODIMENTS

This invention relates to novel solid state solutions of certain aromatic diamines in diesters of benzophenonetetracarboxylic acid. More specifically, the present invention relates to such solutions which are monomeric, resinoidlike, water insoluble, isolable solids of practically unlimited shelf life with low, broad melting points, and which can be converted to high temperature resistant polyimides as by the application of heat. The invention is also concerned with the preparation of such solutions and their conversion to polyimides and to polyamic acid precursors therefor.

The diamines which can be used in forming the solid state solutions of the present invention are those which have a primary amine basicity constant of $10^{-11}$ or lower and the formula $H_2N-Ar-NH_2$, where Ar is a divalent radical characterized by aromatic unsaturation. The preferred diamines are 2,6-diaminopyridine and 4,4'-diaminodiphenyl sulfone.

We have found that, in contrast to the diamines that have heretofore been used in the formation of polyimides [1] and which react with tetracarboxylic acids and their derivatives even at room temperatures to form the corresponding polyamic acids, those of the type employed in the present invention do not react to form such polymers (or even salts or adducts) even at much higher temperatures (60–90° C. and above). At such temperatures the diamines heretofore employed of course react at a rapid rate.

While such extreme unreactivity of the amino groups of the diamines of the present invention might under ordinary circumstances be considered a disadvantage, we have found that this property is an asset as far as the present invention is concerned since it permits the formation of solid state solutions which have a practically unlimited shelf life, an advantage which is of considerable economic importance and is not possessed by any heretofore known polyimide precursors of which we are aware. In fact, because of their extremely limited shelf life polyimides have heretofore not been used successfully in commercial applications where the shelf life of the precursor must be longer than a few weeks.[2]

We attribute this important advantage to the fact that the resinoids of the present invention are formed from extremely weak primary diamines in which the primary amino groups generally have a base dissociation constant of $10^{-12}$ or lower while the primary amino groups of the diamines heretofore employed in polyimides such as those described in the patents listed above are generally 100 or more times as strong; i.e., they have base disassociation constants of about $10^{-10}$ and are consequently so reactive even at ambient temperatures that polymerization proceeds at a rate resulting in an acceptably short shelf life.

Specific examples of diamines which can be used in forming the solid state solutions of the present invention include 4,4'-diaminodiphenyl sulfone and 2,6-diaminopyridine as mentioned above. These amines are among the weakest aromatic diamines known, having primary amine base disassociation constants of $10^{-12}$.

In conjunction with the foregoing aromatic diamines with electron-withdrawing substituents on the ring become weaker bases as the electron-withdrawing strength of the substituent increases. Thus the presence of a nitro or sulfone moiety as a substituent on an aromatic nucleus reduces the basicity of the amino groups present on the ring. Accordingly, nitro- and sulfone-substituted anilines are weaker than aniline, for example; and, similarly, diaminodiphenyl sulfone is a weak amine because it has an electron-withdrawing group as a substituent on the aromatic rings.

With respect to this phenomenon pyridine compounds behave like their homocyclic counterparts with electron-withdrawing substituents. For example, for purposes of electrophilic substitution, pyridine has the same order of reactivity as nitrobenzene (as has been mentioned above, the nitro radical is a strong electron-withdrawing group). It therefore follows and has been found that diaminopyridines are weaker than phenylenediamines and of the same order of primary amine strength as nitrophenylenediamines and that such amines (pyridinediamines) are accordingly also useful in the preparation of the resinoid precursors of the present invention.

The tetracarboxylic acid diesters useful in the practice of the present invention are those derived from benzophenonetetracarboxylic acid and having the formula:

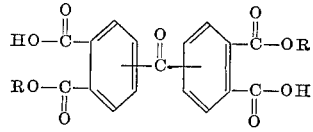

where R is an alkyl or substituted alkyl group. If alkyl, this group will typically be methyl, ethyl, propyl, butyl, or benzyl. Other alkyl radicals may, however, equally well be employed.

It should be noted that the diesters of benzophenonetetracarboxylic acid that are used in the present invention are the anhydride-forming isomers, and that generally these are prepared by reaction of the dianhydride with the esterifying alcohol according to the following reaction:

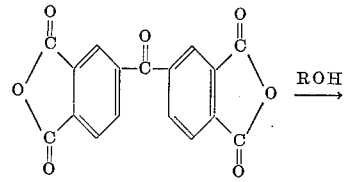

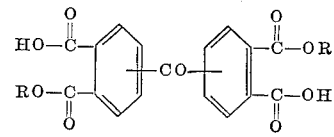

---
[1] Typical of such "prior art" polyimides are those disclosed in U.S. Patents Nos. 3,179,614, 3,179,634, 3,190,856, and 3,347,808 and British Patent No. 570,858.
[2] In conjunction with the foregoing the resinoids of the present invention have a practically unlimited shelf life both before they enter into a fabrication process and in intermediate forms such as resin-impregnated glass fabrics and ceramic-filled precursors.

The ester groups are therefore one to each ring rather than both on the same ring.

Changing the alkyl group merely affects the curing rate of the product, the higher alkyl groups requiring higher cure temperatures or longer cycles. In addition, since the resinoid is isolated from the corresponding alcohol and is often used in solution with the same alcohol as a solvent, the fact that the size of the alkyl group affects the boiling point of the alcohol, means that changes in the alkyl groups result in variation of the properties associated with the resinous nature of the material such as tackiness, drying time, et cetera.

In this conjunction it should be noted that the chemical structure of the cured polymer is independent of the alkyl group used in its preparation as the alkyl group becomes part of the condensation products, which are eliminated in the curing process. This is apparent from the structure of the cured polymer, which is represented by the formula:

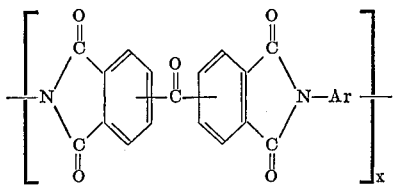

where Ar is

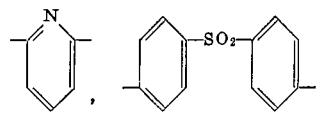

or such other radical as will result in a parent diamine having a base dissociation constant of $10^{-11}$ or lower.

The novel imide-forming materials of the present invention may be prepared by heating the selected acid diester until it becomes a liquid. A stoichiometric amount of the diamine is then added and the mixture agitated until it becomes homogeneous. Upon cooling a solid or semisolid, resinoid solution of the diamine in the tetracarboxylic acid derivative is obtained.

Alternatively, the novel solid state solutions described above may be prepared by dissolving an appropriate tetracarboxylic acid anhydride in a suitable solvent which will also convert the anhydride to the desired tetracarboxylic acid diester. Examples of solvents which can be employed to effect such conversions include methanol, ethanol, n-propyl alcohol, isopropyl alcohol, benzyl alcohol, and ethylene glycol monomethyl ether. Other such solvents will be readily apparent to those of ordinary skill in the relevant arts.

In addition to having a much longer shelf life than those heretofore known, the resinoids of the present invention are superior to heretofore known polyamide precursors such as the polyamic acids described in a number of patents including U.S. Patents Nos. 3,179,614 to Edwards, 3,179,633 to Endrey, and 3,190,856 to Lavin et al. and in British patent specification No. 627,205 by Lincoln et al. in that they are not polymeric, do not require the use of high boiling, expensive solvents to make them, and are produced by a much simpler process. More over they can be spray dried since the solvents used have low boiling points, and they do not require the use of catalytic solvents. These, which are employed in prior art processes for producing polyimides, cause discoloration of the final polymer and also promote polymerization which causes the precursor to become less soluble and more difficult to handle, often to the point of uselessness.

Further, in contrast to many previously known polyimide precursors, the novel imide-forming materials disclosed herein have low melting points (often below 80° C.) and are highly soluble in low boiling, low cost organic solvents (alcohols, ketones, etc.).

Furthermore, the imide-forming materials of the present invention are solids and can therefore be used directly in injection molding, melt coating, etc. whereas the precursors disclosed in patents such as Nos. 3,179,634 and 3,190,856 are liquid solutions and are limited in use to film, coating, and impregnation techniques.

Also, being solids, the imide formers disclosed herein can be shipped and otherwise handled at a much lower cost than those described in the foregoing patents.

Furthermore, the novel precursors we have invented yield polyimides that are equal to, and for some applications better than, polyimides made by heretofore known processes. For example, we have found that in polyimide-impregnated laminated structures or polyimide coatings, the polymers resulting from the polymerization of the resinoids of the present invention are superior to any heretofore known, particularly with respect to their physical appearance. The reason for this apparently is that the solvents in which heretofore known imide-forming precursors are generally prepared, such as N,N-dimethylacetamide and N-methylpyrrolidone, cause darkening of the finished product as discussed above. By forming solid state solutions in accord with the present invention we have eliminated the need for such reaction media and have accordingly eliminated the accompanying side reactions, which were responsible for the darkening of the finished product.

Another advantage of the imide formers described herein, especially over those described in Patent No. 3,190,586, is that the volatiles evolved in their production are essentially condensation products and not solvents such as cresol which is the case in the process described in the latter patent. The presence of cresol is particularly undesirable since cresol promotes reactions which are detrimental to the properties of the monomeric materials which are desired. Cresol is also difficult to eliminate and, because of its sensitivity to atmospheric oxygen, causes discoloration.

There is also another important distinction between our process and that disclosed in the patent just mentioned. Specifically, water, which is also employed as a solvent in the Lavin process, is expressly avoided in our process. This is because it causes partial salting out of the diamine, thus precluding the formation of a stoichiometric solution of a diamine in the tetracarboxylic acid derivative. In other words, the presence of water precludes the formation of the novel and highly desirable solid state solutions contemplated by the present invention.

Furthermore, in contrast to heretofore known polyimide precursors of the type described in Canadian Patent No. 701,460 to Lavin as "intimate mixtures of . . . dry solid monomers," for example, the materials of the present invention are solid state solutions obtained from a stoichiometric mixture of monomers in solution. Thus, while the process described in the Canadian patent are mixtures at the crystalline level, the process of the present invention results in mixtures at the molecular level. This is important because the products of the present invention may be polymerized at a much slower rate and much more uniformly than those of the process just mentioned.

Among the applications where the novel imide-forming materials of the present invention can be used to particular advantage are the following:

(A) Metal-to-metal adhesives. In this application the resinoid is mixed with aluminum to form a suspension and knife-coated onto a glass fabric support or carrier. The carrier is sandwiched between the objects to be joined, and this is followed by an elevated temperature cure to convert the resinoid to a high molecular weight polyimide.

(B) Laminated structures obtained by subjecting preformed objects which have been preimpregnated with an imide-forming material according to the present invention to a pressure-heating cycle.

(C) Honeycomb-type structures obtained by suitable preformation of objects using open-weave glass fabric preimpregnated with a resinoid according to the present invention.

(D) Preimpregnated fabric for the above and other applications. These are prepared by solution-, melt-, or knife-coating the fabric with the resinoid with or without additives or fillers.

(E) Solutions of these resinoids for vehicles to grind and suspend paint pigments. The pigmented mixtures form high-temperature resistant coatings and insulators when dried and cured.

(F) Casting of unpigmented films from solution or melt. Upon suitable curing, such films exhibit toughness and flexibility as well as low thermal discoloration.

The polyimides produced upon curing the novel imide formers of the present invention can of course also be used in other applications for which the polyimides heretofore known are suitable.

From the foregoing it will be apparent that one important and primary object of the present invention resides in the provision of novel, improved imide-forming materials of substantially unlimited shelf life and in processes for preparing such materials and for converting them to high molecular weight polymers which are resistant to very high temperatures.

Other important but more specific objects of the present invention reside in the provision of novel imide-forming materials which:

(1) are monomeric.
(2) in conjunction with the preceding object, are solid state solutions obtained by physically mixing solutions of aromatic diamines with tetracarboxylic acid derivatives without chemical reaction.
(3) are easily and inexpensively handled solid and semi-solid, resinoidlike materials which are isolable at room temperature.
(4) are particularly well suited for use:
 (a) in metal-to-metal adhesives.
 (b) in the production of laminated and honeycomb structures.
 (c) in the manufacture of preimpregnated fabrics for various applications.
 (d) as vehicles for grinding and suspending pigments in paints which can thereafter be cured to produce high-temperature resistant coatings and insulators.
 (e) in casting tough, flexible films having a low degree of thermal discoloration from solutions and melts.
(5) can be prepared cheaper, by a simpler process, and with less discoloration than imide-forming materials heretofore known.
(6) can be spray dried.
(7) have low melting points and are highly soluble in inexpensive, low boiling point solvents.
(8) have a substantially unlimited shelf life and are not sensitive to atmospheric oxygen at room temperature.
(9) can be used directly in injection molding, melt coating, and similar manufacturing processes.

Other objects and advantages and additional novel features of the present invention will be apparent to those skilled in the relevant arts from the foregoing general description of the invention, from the appended claims, and from the following examples, which illustrate the preparation of typical imide-forming materials in accord with the invention and the conversion of such materials to polyimides and to polyamic acid intermediates.

EXAMPLE I

Benzophenone-3,3',4,4' - tetracarboxylic acid dianhydride (BTDA) (322 g., 1 M) was placed in 1 l. of anhydrous methanol (MeOH), and the mixture was refluxed with stirring until the solution was complete. Previously recrystallized 4,4'-diaminodiphenyl sulfone [3] (DADPS) (248 g., 1 M) was added to the resulting yellowish solution in 50 g. increments with stirring and reflux, which were continued after all of the diamine had been added until the solution became homogeneous. The excess methanol was then distilled off under reduced pressure at 60° C. leaving a solid, amber, monomeric resinoid melting at about 80° C.

This resinoid was very soluble in methanol, acetone, methyl ethyl ketone, ethanol, ethyl acetate and other inexpensive, low boiling solvents. Prolonged drying of a small sample of the resinoid at 60° C. under vacuum, while trapping the volatiles, indicated that the retained amount of alcohol was less than ten percent. This indicated the presence of a solid solution of the diamine in the semisolid dimethyl ester-diacid and a small percentage of the alcohol.

A solution of the resinoid, in alcohol, was poured into a large volume of n-hexane, and a precipitate formed. The precipitate was found to be an almost quantitative amount of uncombined diamine. This further indicated that the resinoid was solely a physical mixture of the amine and acid derivative.[4] This mixture, however, unlike the "intimate mixtures of the dry solid monomers" described in Canadian Patent No. 701,460, are mixtures at the molecular level rather than mixtures of crystals of each component.

EXAMPLE II

Benzophenonetetracarboxylic acid dianhydride (332 g., 1 M) was allowed to react with dry methanol as in Example I. The excess methanol was distilled off, yielding a brownish yellow semisolid. This was taken up in sodium carbonate solution, forming the disodium salt of the acid. The resulting yellow aqueous solution was treated with charcoal, filtered, and then neutralized with acetic acid. This liberated the diacid-diester, which was taken up in ethyl acetate. The organic layer was isolated and dried with $MgSO_4$. Upon vacuum removal of the solvent, a yellowish, semisolid, hygroscopic, resinous, diacid-diester with a melting point of about 60° C. was obtained.

Higher diesters including ethyl, n-propyl, isopropyl, and benzyl were prepared in a similar fashion. These, as well as the methyl diester, were resinous semisolids with low melting points.

Such isolated diesters can be used without dissolution in a solvent in the preparation of the novel imide-forming solid state solutions of the present invention. To demonstrate this diethyl benzophenonetetracarboxylate was heated on a water bath until it become a viscous fluid. An equimolar amount of diaminodiphenyl sulfone was added to the fluid, and the mixture was heated in the bath with agitation until homogeneous. The amber viscous material thus obtained was then cooled. This produced a resinoid similar to that described in Example I.

EXAMPLE III

Benzophenonetetracarboxylic acid dianhydride (80.5 g., 0.25 M) was added to 250 mls. of dried ethanol. The mixture was stirred and heated until it became homogeneous. Diaminodiphenyl sulfone (62 g., 0.25 M) was added to the solution with refluxing. Upon completion of the addition, the solution remained homogeneous. The resinoid produced upon removal of the excess ethanol was somewhat lighter than, but otherwise identical to, that described in Example I.

EXAMPLE IV

The procedure used in Example I was repeated with n-propyl alcohol as the esterifying agent and solvent. The resulting resinoid was most soluble in a mixture of

---

[3] Imide-forming solutions which are mixtures of derivatives of benzophenons-3,3',4,4''-tetracarboxylic acid and 4,4'-diaminodiphenyl sulfone give exceptionally good results.

[4] A similar salting out of uncombined amine can be obtained by dissolving the resinoid in a water-alcohol solution or other diluent.

propanol and methyl ethyl ketone but was otherwise similar to that described in Example I.

EXAMPLE V

The same procedure was used with isopropyl alcohol as the reactant-solvent. After the final addition of the diamine, a small amount of methyl ethyl ketone was added to reduce the time necessary to effect solution. The resinoid obtained was similar to that described in Example I.

EXAMPLE VI

Benzophenonetetracarboxylic acid dianhydride (16.15 g., 0.05 M) was dissolved in 50 mls. of benzyl alcohol at 100° C. Diaminodiphenyl sulfone (12.4 g., 0.05 M) was added to the resulting solution with heating and stirring. Removal of the excess benzyl alcohol produced a glassy resinoid which was soluble in methanol-acetone and had the general characteristics of the resinoid described in Example I.

EXAMPLE VII

Benzophenonetetracarboxylic acid dianhydride (32.2 g., 0.1 M) was dissolved in 100 mls. of anhydrous methanol. 2,6-diaminopyridine (10.9 g., 0.1 M) was added to this solution with stirring until it dissolved. The resinoid remaining after removal of the excess solvent was somewhat greenish, but otherwise had characteristics similar to the resinoid of Example I.

EXAMPLE VIII

Benzophenonetetracarboxylic acid dianhydride (32.2 g., 0.1 M) was dissolved in 100 mls. of ethylene glycol-monomethyl ether. Diaminodiphenyl sulfone (24.8 g., 0.1 M) was added to this solution, and the mixture was heated, with stirring, until homogeneous. The resinoid obtained upon vacuum removal of the solvent was similar to that described in Example I.

Furthermore, infrared analysis of the alcohol-insoluble gel showed an absorption at 1525 cm.$^{-1}$ indicating solution amidization. In contrast, infrared spectra of the resinoids described in Examples I–VIII showed no amide absorption at 1525 cm.$^{-1}$, indicating that there is no amide forming reactions involved in making the imide-forming materials of the present invention.

EXAMPLE X

To demonstrate the substantially unlimited shelf life of the resinoids of the present invention, samples of these were compared with analogous combinations of materials of the type heretofore available and described in U.S. Patent No. 3,347,808.

Sample A consisted of a solid state solution of diaminodiphenyl sulfone in the dimethyl ester of benzophenonetetracarboxylic acid prepared according to Example I. Sample B was a solid state solution of 2,6-diaminopyridine in the dimethyl ester of benzophenonetetracarboxylic acid prepared according to Example VII. Samples C and D were prepared following the same procedure but using 4,4'-bisoxyaniline and m-phenylenediamine respectively rather than the preferred diamines of the present invention utilized in samples A and B (these diamines are used in preparing the intimate solutions described in U.S. Patent 3,347,808).

The solid materials A–D were dissolved in methanol in equal concentrations and the solutions were stored in clear glass containers at temperatures varying from 50° F. to 78° F. Infrared spectra of these solutions were obtained periodically. Sample D showed an amide absorption at 1520 cm.$^{-1}$ after 16 days, indicating that polymerization had started taking place. Sample C showed the same absorption after 31 days. Samples A and B showed no such absorption after 120 days.

In another test, portions of the solutions described above were used to impregnate glass fabric. The "prepreg" (glass TABLE I.—SUMMARY OF THE PREPARATION OF THE SOLID SOLUTION RESINOIDS OF EXAMPLES I–VIII

| Example cited | BTDA diester | Solution medium | Diamine | Solubility of resinoid | Approx. M.P. of resinoid (° C.) | Appearance of the solution | Gel time at 400° F. (min.) |
|---|---|---|---|---|---|---|---|
| I | Me- | MeOH | DADPS | s. in MeOH, EtOH, Acetone MEK, EtOAc. | 60 | Dark red | 1 |
| II | Et- | None | DADPS | | 60–70 | | |
| III | Et- | EtOH | DADPS | s. in MeOH, EtOH, Acetone MEK, EtOAc. | 60–70 | Dark red | 1 |
| IV | Pr- | PrOH | DADPS | s. in PrOH-EtOAc, PrOH-MEK | 100 | Amber | 2–3 |
| V | iPr- | iPrOH-MEK | DADPS | s. in iPrOH-EtOAc, iPrOH-MEK | 100 | ....do.... | 2–3 |
| VI | φCH₂- | MeOH | DADPS | s. in MeOH-EtOAc | 80 | Dark red | 15 |
| VII | Me- | MeOH | DAP | s. in MeOH, EtOH, Acetone EtOAc | 60 | Yellowish-green | 1 |
| VIII | MeO-(CH₂)₂- | MeO-(CH₂)₂OH | DADPS | s. in MeOH | 60 | Dark red | 5 |

BTDA=3,3',4,4'-benzophenonetetracarboxylic acid dianhydride; DADPS=4,4'-diaminodiphenyl sulfone; DAP=2,6-diaminopyridine.

EXAMPLE IX

To demonstrate that the imide-forming materials of the present invention are substantially different from the type of imide former obtained by following the procedure heretofore typically employed such as that outlined in U.S. Patent No. 2,880,230, pyromellitic dianhydride (PMDA) (21.8 g., 0.10 M) was dissolved in 100 mls. of anhydrous methanol. Diaminodiphenyl sulfone (24.8 g., 0.1 M) was added to this solution, and the mixture was stirred until homogeneous When enough solvent had been removed by distillation to leave a seventy percent solution and the material cooled, a gel which was insoluble in alcohol precipitated.[5] In contrast, all of the resinoids described in Examples I–VIII were highly soluble in alcohol.

---

[5] Depending upon the particular imide-former involved, solutions of the patented imide forming materials will precipitate at solids concentrations of 35 percent or even lower. In contrast there is no precipitation when solutions of the imide-forming materials disclosed herein are cooled even though the concentration of solids is 80 percent or higher; and the solutions remain amorphous even when evacuated to dryness.

fabric impregnated with resinoid solutions) was allowed to dry and kept at room temperature exposed to the air. Samples C and D darkened considerably (from light yellow to brown indicating that oxidation had taken place) after 4 days. Samples A and B, however, were still a light yellow after 120 days indicating that no appreciable oxidation had occurred.

The resinoids of Examples I–VIII were heated in air, using the following cycle: two hours at 250° F., one hour at 400° F., and fifteen hours at 600° F. In all cases this resulted in high polymers that were infusible, insoluble, and yellow to brownish yellow in appearance. Heating of the material obtained in Example IX following the same cycle did not produce a high polymer.

As mentioned above, two applications in which the present invention may be employed to particular advantage are metal-to-metal adhesives and laminated structures. The following tables illustrate the excellent properties which can be obtained by using the novel imide formers of the present invention in these applications and then converting them to high polymers by heat curing.

TABLE II

Typical strength properties of some polyimides of the present invention in metal-to-metal adhesive using 17-7 pH stainless steel and a ½-inch bond overlap

| | P.s.i. |
|---|---|
| At room temperature | $3.0 \times 10^3$ |
| After 24 hours at 600° F. | $2.1 \times 10^3$ |
| After 48 hours at 600° F. | $2.1 \times 10^3$ |

TABLE III

Typical strength properties of fiberglass reinforced laminates prepared from polyimide copolymers of the present invention

| | |
|---|---|
| Laminating pressure, p.s.i. | 200 |
| Ultimate flexural stress (K s.i.): | |
|    At room temperature | 80.0 |
|    After 100 hrs. 600° F. | 60.0 |
|    After 200 hrs. 600° F. | 50.0 |
| Modulus of elasticity: | |
|    At room temperature | $3.8 \times 10^6$ |
|    After 100 hrs. 600° F. | $2.7 \times 10^6$ |
|    After 200 hrs. 600° F. | $3.5 \times 10^6$ |

Similar good results are obtained in other of the applications discussed above.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A substantially monomeric, imide-forming material which is essentially a solid state solution of an aromatic diamine in a tetracarboxylic acid derivative, said diamine and said acid derivative being present in substantially stoichiometric proportions; said diamine having a primary amine basicity constant not exceeding about $10^{-11}$ and the formula

wherein Ar is a divalent radical characterized by aromatic unsaturation and said tetracarboxylic acid derivative having the formula

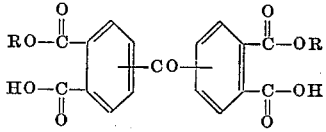

wherein R is selected from the group consisting of alkyl and substituted alkyl wherein the substituent is a methoxy group or a phenyl group.

2. A monomeric material consisting of a solution of 4,4'-diaminodiphenyl sulfone in an anhydride-forming alkyl diester of benzophenone-3,3',4,4'-tetracarboxylic acid, the constituents being present in substantially stoichiometric proportions.

3. A monomeric material consisting of a solution of 4,4'-diaminodiphenyl sulfone in an anhydride-forming isomer of diethyl benzophenone-3,3',4,4'-tetracarboxylate, the constituents being present in substantially equimolar proportions.

4. A substantially monomeric material consisting of a solution of 2,6-diaminopyridine in an anhydride-forming alkyl diester of benzophenone-3,3',4,4'-tetracarboxylic acid, the constituents being present in substantially stoichiometric proportions.

References Cited

UNITED STATES PATENTS

| | | | |
|---|---|---|---|
| 3,347,808 | 10/1967 | Lavin et al. | 260—29.1 |
| 3,349,061 | 10/1967 | Pruckmayr | 260—47 |

WILLIAM SHORT, Primary Examiner

L. L. LEE, Assistant Examiner

U.S. Cl. X.R.

117—161; 161—223; 260—65, 78, 78.4

UNITED STATES PATENT OFFICE
CERTIFICATE OF CORRECTION

Patent No. 3,506,583      Dated April 14, 1970

Inventor(s) William R. Boram and Luis Acle, Jr.

It is certified that error appears in the above-identified patent and that said Letters Patent are hereby corrected as shown below:

Column 2, line 10, change "acceptably" to --unacceptably--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents